April 23, 1974 T. A. ALLISON Re. 27, 980

FRANGIBLE BOTTLE CAP

Original Filed Nov. 4, 1968

Tommy A. Allison INVENTOR

Tommy A. Allison

United States Patent Office

Re. 27,980
Reissued Apr. 23, 1974

27,980
FRANGIBLE BOTTLE CAP

Tommy A. Allison, 5848 4th St.,
Los Angeles, Calif. 90043

Original No. 3,512,673, dated May 19, 1970, Ser. No. 773,249, Nov. 4, 1968. Application for reissue Jan. 27, 1972, Ser. No. 221,454
Int. Cl. B65d *43/02*
U.S. Cl. 215—46 A 1 Claim

Matter enclosed in heavy brackets [ ] appears in the original patent but forms no part of this reissue specification; matter printed in italics indicates the additions made by reissue.

ABSTRACT OF THE DISCLOSURE

A bottle cap for beverages which does not require an opener. This cap can be removed from the neck of the bottle by pulling up a tongue which will cause the body of the cap to shear and rupture sufficiently so that the cap may be easily removed with the fingers.

This invention relates to bottle caps, and more particularly to bottle caps which do not require an opener.

It is therefore the main purpose of this invention to provide a beverage bottle cap which may be easily removed extending from the cap body.

Another object of this invention is to provide a beverage bottle cap which will require no openers to remove it from the beverage bottle.

A further object of this invention is to provide a bottle cap which will have scored marks across the cap body which will shear enough so that the cap may be raised upward which will allow the quick removal of the cap from the bottle.

Other objects of this invention are to provide a bottle cap which is simple in design, inexpensive to manufacture, rugged in construction, easy to use and efficient in operation.

These and other objects will become readily apparent upon a study of the following specification together with the accompanying drawing wherein.

Figure 1:
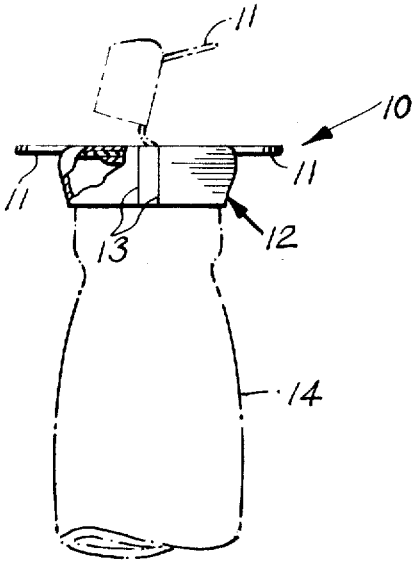
FIG. 1 is a side view of the present invention shown partly broken away with a fragmentary bottle shown in phantom lines. The cap is also shown partially removed from the neck of the bottle being bent upwards which is shown in phantom lines.
Figure 2:
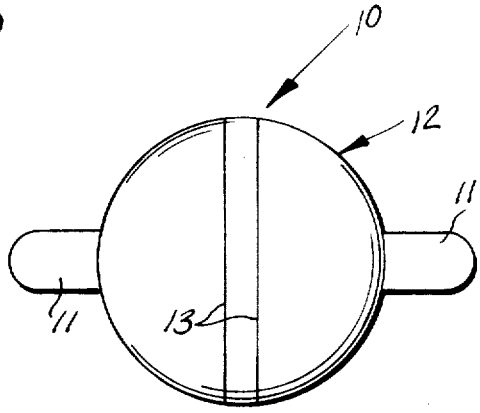
FIG. 2 is an enlarged top plan view of the cap.
Figure 3:
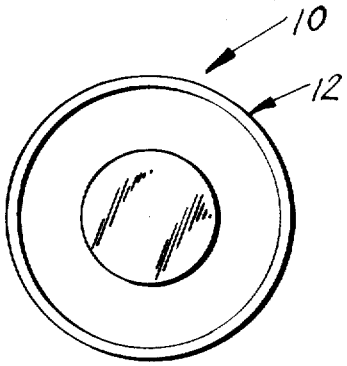
FIG. 3 is a bottom plan view of FIG. 2 and is shown in fragmentation.

According to this invention, a beverage bottle cap 10 is provided with a pair of oppositely opposed tongues 11, which extend horizontally from the cap body 12 in order to provide for easy tightening. The cap body 12 is also provided with a pair of scored marks 13 which are designed to be severed in order that the cap 10 may be removed from the bottleneck 14.

In use, the tongues 11 which are of thicker material than the cap body 12, are bent upward which will cause a severing or shearing at the scored marks 13 which will allow one half of the cap body 12 to be lifted upward and away from the bottleneck 14. When this occurs, the other half of the cap bottle 12 may also be removed with slight pressure being applied to the corresponding tongue 11.

It will be noted that the seaming means on the interior of cap body 12 is that which is used conventionally.

It shall further be noted that this structure will keep the contents of a bottle perfectly air-tight and may be made of any suitable material.

While various changes may be made within the detailed construction it is understood that such changes will be within the spirit and scope of the present invention as is defined by the appended claims.

What I now claim is:

1. A beverage bottle cap comprising:

a crown member having a flat, circular top and a depending skirt, the skirt being secured to the neck of the bottle;

a pair of spaced apart, generally parallel score marks extending across said top at substantially the center thereof, said marks each extending down the skirt to the edge thereof; and a tongue corresponding to each of said score marks and cooperating therewith to define a severable portion of said cap, said tongues being oppositely disposed on the cap, lying in the same horizontal plane as the top of said cap, and in perpendicular relationship to the score marks, [the tongues each being of material thicker than that from which the cap is formed] whereby, when a lifting pressure is applied to said tongues, the corresponding severable portions of the cap will be removed by shearing along said score marks.

References Cited

The following references, cited by the Examiner, are of record in the patented file of this patent or the original patent.

UNITED STATES PATENTS

| | | | |
|---|---|---|---|
| 3,200,982 | 8/1965 | Cormier | 215—46 A |
| 3,421,654 | 1/1969 | Hexel | 220—27 X |

FOREIGN PATENTS

| | | | |
|---|---|---|---|
| 692,393 | 2/1962 | Italy | 215—46 A |

GEORGE T. HALL, Primary Examiner

U.S. Cl. X.R.

220—27